United States Patent [19]
Tripathy et al.

[11] Patent Number: 5,994,498
[45] Date of Patent: Nov. 30, 1999

[54] METHOD OF FORMING WATER-SOLUBLE, ELECTRICALLY CONDUCTIVE AND OPTICALLY ACTIVE POLYMERS

[75] Inventors: Sukant Tripathy, Acton; Lynne A. Samuelson, Marlboro; K. Shridhara Alva, Lowell; Jayant Kumar, Westford, all of Mass.; Kenneth A. Marx, Francestown, N.H.

[73] Assignee: Massachusetts Lowell, University of Lowell, Mass.

[21] Appl. No.: 08/915,827

[22] Filed: Aug. 21, 1997

[51] Int. Cl.$^6$ .................................................. C08G 73/00
[52] U.S. Cl. ...................... 528/422; 528/487; 528/491; 528/499
[58] Field of Search .................................... 528/422, 487, 528/491, 499

[56] References Cited

U.S. PATENT DOCUMENTS

| | | | |
|---|---|---|---|
| 5,253,100 | 10/1993 | Yang et al. ......................... | 359/266 |
| 5,370,825 | 12/1994 | Angelopoulos et al. ............ | 252/500 |
| 5,420,237 | 5/1995 | Zemel et al. ....................... | 528/422 |
| 5,489,400 | 2/1996 | Liu et al. ............................ | 252/500 |

*Primary Examiner*—Duc Truong
*Attorney, Agent, or Firm*—Hamilton, Brook, Smith & Reynolds, P.C.

[57] ABSTRACT

Water-soluble polymers are formed by combining a water-soluble analog of a water-insoluble monomer, such as a water-insoluble redox monomer, with a water-based solvent and an enzyme. The water-soluble polymers formed can be electrically conductive or optically active. The water-soluble analog can be copolymerized with a water-insoluble redox monomer to form a copolymer that is also water-soluble. Polymers formed by the method of this invention can be layered on a surface to form, for example, alternating layers of polyanions and polycations.

37 Claims, 13 Drawing Sheets

METHOD OF FORMING WATER-SOLUBLE, ELECTRICALLY CONDUCTIVE AND OPTICALLY ACTIVE POLYMERS

GOVERNMENT SUPPORT

This invention was made with support from the Government under ARO URI Grant DAAL03-91-G-0064, ARO Cooperative Grant DAAH04-94-2-003 and US Army/USDA Contract DAAK60-93-K-0004. The Government has certain rights in this invention.

BACKGROUND OF THE INVENTION

Electrically conductive and optically active polymers have been known for many years. Examples of electrically conductive polymers include polythiophene, polypyrrole and polyaniline. Recently, there has been an increased interest in development of such polymers for application to a wide range of uses, such as, for example, light-weight energy storage devices, electrolytic capacitors, anti-static and anti-corrosive coatings for smart windows and biological sensors. However, the application of electrically conductive and optically active polymers has been limited by some fundamental properties of monomers employed to form these polymers and by processing limitations that limit the quality of the resulting polymers.

Among the most limiting problems of electrically conductive and optically active polymers is their lack of water solubility. Typically, therefore, these polymers are formed in an organic solvent. Attempts to increase the water solubility of these polymers have included derivatization of the polymer following its formation. However, derivatization of electrically conductive and optically active polymers requires several steps and generally proceeds under relatively harsh reaction conditions including, for example, use of fuming sulfuric acid. Further, such derivatization typically results in only partial substitution and, therefore, the improvement in water solubility is limited. In addition, polymers typically degrade during the derivatization, thereby further limiting the effectiveness of post-reaction attempts to improve water solubility.

Another attempt to improve the water solubility of electrically conductive and optically active polymers has been derivatization of monomers and subsequent polymerization in an organic solvent. However, the polymerization rate of derivatized monomers is typically diminished.

Most recently, enzymes, and most notably, horseradish peroxidase, have been employed to accelerate the reaction rate of derivatized monomers. Nevertheless, such reactions, in the context of an organic solvent, generally must be conducted at a relatively low pH. Further, generation of water molecules as a consequence of enzyme catalyzed reactions has typically required that such reactions be conducted in the context of a two-phase reaction system of aqueous micelles. Use of micelles generally limits the polymerization of the polymer and presents additional problems with processing the polymer product, due to the two-phase nature of the reaction system.

Therefore, a need exists to overcome or minimize the above-referenced problems associated with formation of water-soluble electrically conductive and optically active polymers.

SUMMARY OF THE INVENTION

The present invention relates to a method of forming water-soluble, electrically conductive and optically active polymers.

In one embodiment, the method includes combining a water-soluble analog of a water-insoluble redox monomer with a water-based solvent and an enzyme. A reaction mixture is thereby formed that causes the analog to polymerize, thereby forming the water-soluble polymer.

This invention has many advantages. For example, the polymerization occurs in a water-based solvent, thereby eliminating processing problems associated with removal of the polymer product from an organic solvent, or from a reaction system that employs aqueous micelles. Further, the reaction can be conducted at a higher pH that is more environmentally neutral and at which the enzyme is typically more active. Also, the resulting polymers generally are water-soluble regardless of their molecular weight. Water-soluble monomers can also be combined with water-insoluble monomers for polymerization by the method of the invention to form water-soluble copolymers. The polymers can also be doped with ions present in a buffer component of the aqueous solvent, thereby causing the polymer composition to be self-doped.

Polymers formed by the method of the invention can be formed in higher purity and with greater uniformity, less branching and fewer co-products or impurities, because the polymer does not need to be separated from an organic solvent, and because the polymer product typically does not require subsequent derivatization to obtain the necessary water-solubility. The polymer product generally is also more stable than products derivatized after polymerization. Consequently, the polymers formed by the method of the invention exhibit greater electrical conductivity and/or optical activity. Further, polymers formed by the method of the invention are better suited to many applications, such as self-assembled mono and multi-layered fabrication of thin film devices and structures. Also, the polymer products exhibit a greater availability of functional groups for further molecular engineering, such as incorporation of biological molecules and of polymers employed to form biosensors.

DETAILED DESCRIPTION OF THE INVENTION

Figure 1:
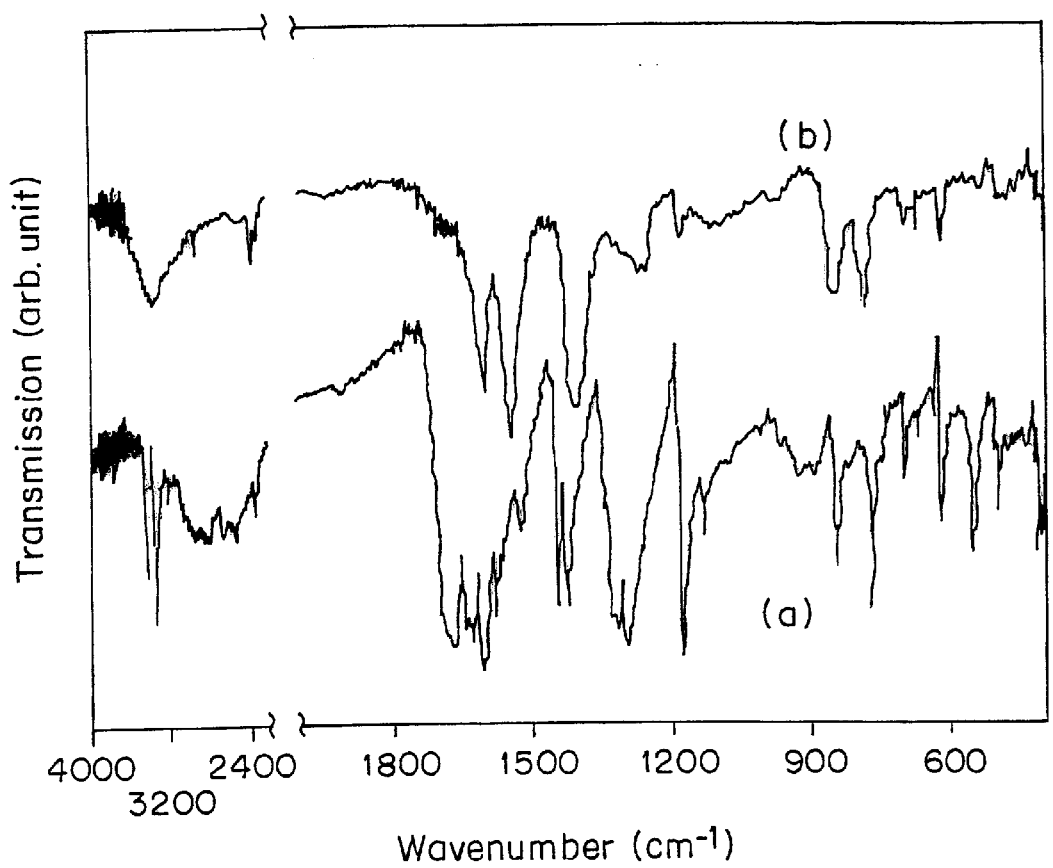
FIG. 1 shows FT-IR spectra of (a) p-aminobenzoic acid monomer and (b) poly(p-aminobenzoic acid) in KCl formed by the method of the invention.

The features and other details of the apparatus and method of the invention will now be more particularly described and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The method of the invention includes forming a water-soluble polymer by polymerizing a water-soluble analog of a water-insoluble monomer. Preferably the water-insoluble monomer is a redox monomer. A "redox monomer," as defined herein, is a monomer that will polymerize by a redox reaction. The polymerization reaction occurs in a reaction mixture that includes, in addition to the water-soluble analog of the water-insoluble redox monomer, a water-based solvent and an enzyme.

The reaction solution is formed by adjusting the pH of a suitable water-based solvent. Preferably, the solvent is water. However, other components of the solvent can include, for example, dimethyl formamide, methanol, ethanol, dioxane, etc. The pH of the water-based solvent is adjusted to a pH in a range of between about 5.0 and about 8.0. In one embodiment, the pH can be adjusted to a range of between about 6.0 and about 7.0. Preferably, the pH is about 6.0. Examples of suitable buffers include Tris-HCl buffer, sodium phosphate, etc. Preferably, the buffer is Tris-HCl buffer.

A suitable enzyme is added to the reaction mixture. The concentration of enzyme in the reaction mixture is sufficient to significantly increase the polymerization rate of the monomer in the reaction solution. Typically, the concentration of enzyme in the reaction mixture is in a range of between about one unit/ml and about five units/ml, where one unit will form 1.0 mg purpurogallin from pyrogallol in 20 seconds at pH 6.0 at 20° C.

Examples of suitable enzymes include peroxidases, laccase, etc. Preferred enzymes are peroxidases. A particularly preferred enzyme is horseradish peroxidase.

A water-soluble analog of a water-insoluble redox monomer is added to the reaction mixture. The concentration of water-soluble analog generally in the reaction mixture is in a range of between about 10 mm and about 100 mm. The water-soluble monomer is suitable for enzyme-catalyzed polymerization to form a water-soluble polymer.

Applicants have discovered that water-soluble analogs for water-insoluble redox monomers can be polymerized to form water-soluble polymers. Examples of suitable water-soluble analogs include water-soluble analogs of anilines, phenols, etc. In one embodiment, the water-soluble analogs include analogs of anilines that also include azo groups, whereby the resulting polymers are optically active.

The water-soluble analogs of the water-insoluble redox monomer generally include a substituent at the ortho- or para-position of an aromatic redox monomer. The substituents can carry a negative or a positive charge when in an aqueous-based solvent. Examples of suitable substituents include carboxyl, sulfonic, phosphonic groups, etc.

The polymerization reaction is initiated by adding a suitable oxidant, such as a hydrogen peroxide solution, etc. In one embodiment, the hydrogen peroxide has a concentration in the solution in a range of between about one millimolar (mm) and about five millomolars. Preferably, the concentration of hydrogen peroxide in the solution added to the reaction mixture is about 30%. The reaction mixture is stirred while adding the hydrogen peroxide solution. Typically, the reaction mixture is maintained at a temperature in a range of between about 10° C. and about 35° C. during polymerization. Preferably, the temperature of the reaction mixture is maintained at a temperature of about 20° C. during polymerization.

It is believed that polymerization of a water-soluble analog of a water-insoluble redox monomer in a water-based solvent that includes an enzyme component enables regular polymerization of the analog to form linear polymers by free-radical polymerization, and that the resulting polymers will remain water-soluble, often regardless of their molecular weight.

In addition to water-soluble analogs of water-insoluble redox monomers, the reaction mixture can include water-insoluble redox monomers. Copolymerization of the water-insoluble analogs and water-insoluble redox monomers generally will result in water-soluble copolymers. In one embodiment, the molar ratio of water-soluble analogs and water-insoluble redox monomers is in a range of between about 1:9 and about 9:1. It is to be understood that copolymerization can include more than one water-soluble analog, or a water-soluble analog of one water-insoluble redox monomer and a second water-insoluble redox monomer, or more. The resulting polymer can be a self-doped polymerization in the presence of Tris-HCl buffer. The polymer can be undoped subsequently by raising the pH of the polymer solution.

In another embodiment, the method of the invention includes polymerization of the water-soluble analog on a surface, whereby a layer of the polymer is formed. In this embodiment, the pH of the polymer solution is reduced to a suitable pH, such as a pH in a range of between about 2.0 and about 8.0, by adding a suitable acid, such as hydrochloric acid, etc. A suitable surface, such as a glass slide treated with an alkali, such as CHEMSOLV®, is immersed in a polymer solution for a sufficient period of time to cause the polymer to accumulate at the surface. In one embodiment, a glass slide is immersed in a polymer solution for about ten minutes and then removed. The surface can then be washed with water at a pH of about 2.5 in order to remove unbound polymer from the surface.

Distinct layers of polymers can be applied to a surface by this method. For example, an initial layer can be formed by exposing a suitable surface to a polymer formed by the method of the invention that is a polycation and then subsequently exposing the same surface, having the polycation deposited upon it, into a solution of a polyanion formed by the method of the invention. In one specific embodiment, a glass slide treated with CHEMSOLV® is exposed to a one milligram/milliliter solution of poly(diallyl dimethyl ammonium chloride) at a pH of 2.5 as a polycation, and then exposed to a one milligram/milliliter solution of two poly(2,5 diaminobenzene sulfonate) formed by the method of the invention, as a polyanion. A bilayer of polymers is thereby formed. Additional layers of these or other polymers can subsequently be applied.

It is to be understood that polymers formed by the method of the invention can be formed ranging from an oxidized, electrically conducting form to a reduced, insulating form of the polymer. It is also to be understood that the polymers formed by the method of the invention can be modified after polymerization. For example, modification can be made at amine functional groups to form amides or imine groups.

Dissolved polymers formed by the method of the invention can be precipitated from solution by reducing the pH with a suitable acid. Examples of suitable acids include hydrochloric acid, etc.

The invention will now be further and more specifically described by the following examples. All parts and percentages are by weight unless otherwise specified.

EXAMPLE 1

Materials and Methods

Horseradish peroxidase (HRP) (enzyme classification number (EC) 1.11.1.7) and Tris-HCl buffer were obtained from Sigma Chemicals Company, St. Louis, Mo. p-Aminobenzoic acid (ABA) and hydrogen peroxide were obtained from Aldrich Chemicals, Inc., Milwaukee, Wis. All the chemicals were used as received.

The enzymatic polymerization of ABA was achieved by HRP catalyzed oxidative free radical coupling. 300 mg of ABA was dissolved in 20 mL of 0.1M Tris-HCl buffer, pH 6.0 containing 300 units of HRP. The reaction was initiated with 200 µL of 30% hydrogen peroxide with continuous stirring. The reaction was allowed to continue for three hours. The pH of the reaction medium was lowered to 1.0 where the polymer precipitates. The precipitate was filtered off to obtain a dark powder of PABA.

Perkin-Elmer LAMBDA-9® UV-Vis-near IR spectrophotometer was used for the spectral characterization of the polymer. The fluorescence experiments were carried out using a SLM 8100 spectrofluorometer. The structural characterization of the polymer was carried out by using NMR and FT-IR spectroscopic techniques. $^1$H NMR spectra were recorded in $D_2O$, using a Bruker 250 MHz NMR Spectrometer. FT-IR experiments were carried out using a Perkin-Elmer FT-IR spectrophotometer. Electrochemical properties of the polymer and the monomer were studied in a three electrode setup (EG&G Applied Princeton Research Potentiostat/Galvanostat model 263, Princeton, N.J.) consisting of a platinum wire working electrode. A platinum mesh electrode and a silver/silver chloride electrode were used as counter and reference electrodes respectively. All experiments were carried out under nitrogen atmosphere with prior saturation of the electrolyte with nitrogen.

RESULTS AND DISCUSSION

Enzyme catalyzed polymerization of ABA proceeded rapidly. The change in absorption spectrum was used to monitor the progress of the polymerization reaction. Absorption spectra changed very rapidly in the first couple of minutes. Subsequently, the change in absorbance was small and became negligible after about 15 min. However, in the bulk polymerization reactions, the reaction was allowed to continue for at least three hours before precipitating the polymer.

The polymer was characterized by FT-IR and NMR spectroscopic techniques. FIG. 1 is a plot of the FT-IR spectrum of the polymer compared to that of the monomer. It was observed from the figure that the NH stretching in the polymer had a broad band at 3450 cm$^{-1}$ which appeared as two clear peaks at 3450 and 3350 cm$^{-1}$ in the case of the monomer. The IR bands in lower energy regions of the spectrum broadened upon polymerization, with the disappearance of peaks at frequencies such as 1700, 1650 and 1450 cm$^{-1}$. The polymerization was also confirmed by proton NMR spectroscopy. The monomer gave two doublets at 7.83 ppm and 6.88 ppm corresponding to the aromatic protons. Upon polymerization, these peaks shifted to 7.82 ppm and 6.89 ppm, respectively, along with the appearance of three broad peaks at 8.04, 7.21 and 7.05 ppm. The appearance of multiple peaks suggested that both types of bonds, as shown in a proposed reaction mechanism, below, were present in the resulting polymer. The average molecular weight of the polymer was about 3000 daltons. The proposed reaction mechanism is as follows:

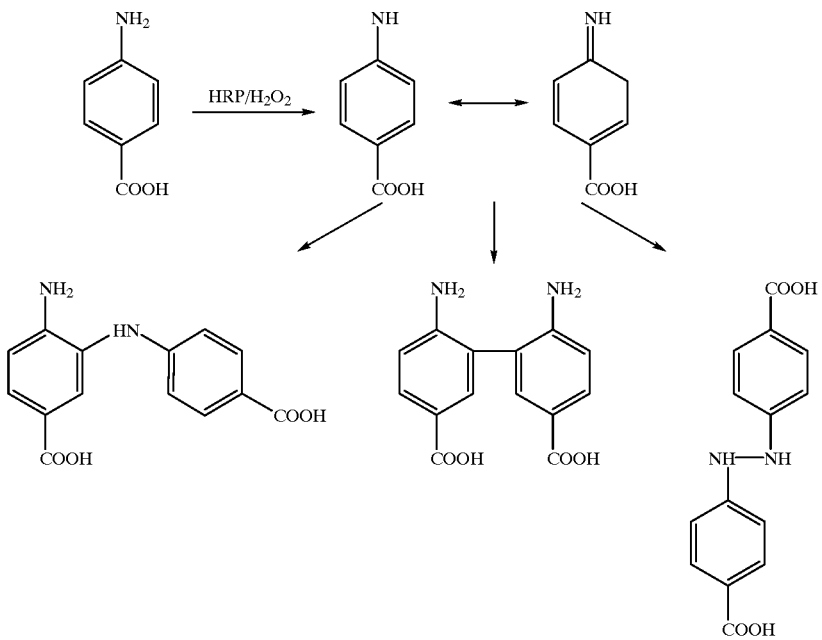

Figure 2:
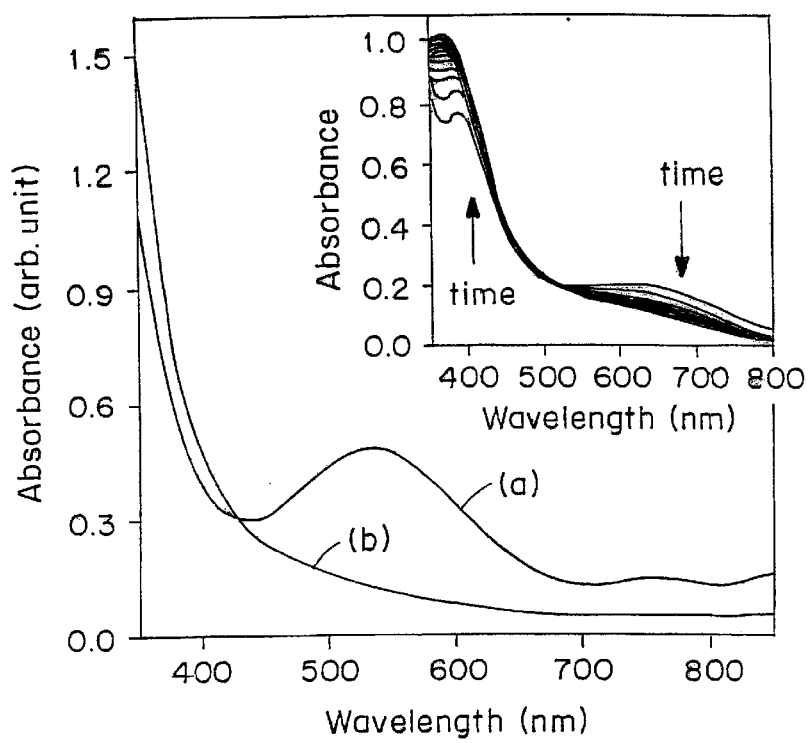
FIG. 2 shows absorption spectra of poly(p-aminobenzoic acid) in (a) acid solution and (b) alkaline solution. The inset gives the absorption spectra recorded at two minute time intervals during undoping of the polymer at pH 12.0.
Figure 3:
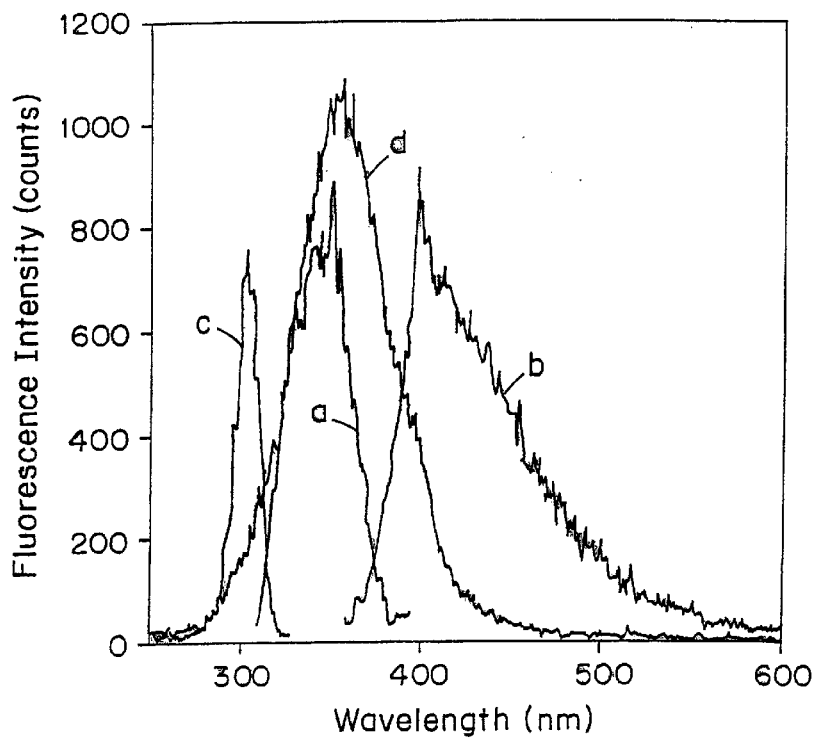
FIG. 3 shows excitation and emission spectra of poly(p-aminobenzoic acid) in acidic and alkaline solutions. Curves (a) and (b) are the excitation and emission spectra of the polymer in acidic solution. Curves (c) and (d) are the excitation and emission spectra in alkaline solution.

The polymer was doped with the ions present in the buffer. The self doping of the polymer was established by recording the absorption spectrum of the polymer at various pH conditions. FIG. 2 shows two typical absorption spectra of the polymer covering the acidic and alkaline regimes. The absorption characteristics of the polymer did not show any drastic change up to a pH of 10.0. Above pH 10.01 the solution color changed to green which subsequently turned to yellow after about 15 min. The inset in FIG. 2 shows a set of absorption spectra recorded with a time interval of two minutes during undoping at a pH of 12.0. This suggests that the undoping of PABA followed a slow reaction kinetics. The emission characteristics of PABA also differ in its doped and undoped forms, as shown in FIG. 3. The excitation and emission spectra of doped PABA (a and b) are broader as compared to that of the undoped PABA (curves c and d). The doped form of the polymer had an emission maximum at 400 nm (curve b) while that of the undoped form shifted to 360 nm (curve d). Curves (a) and (b) are the excitation and emission spectra of the polymer in acidic solution. Curves (c) and (d) are the excitation and emission spectra in alkaline solution. The conductivity of the as-synthesized self-doped polymer was in the semiconducting regime ($10^{-5}$ Siemens/cm).

Figure 4:
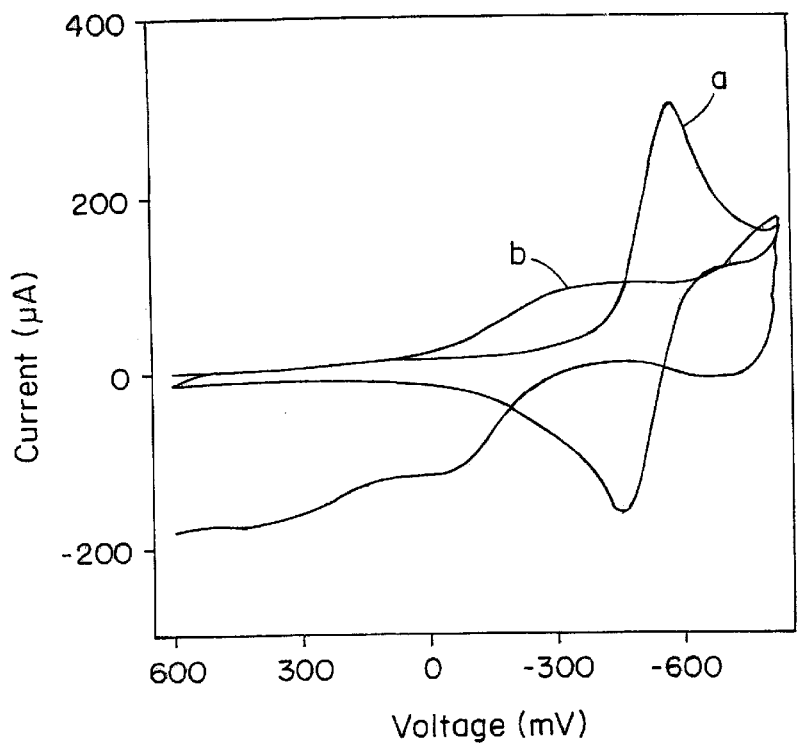
FIG. 4 shows cyclic voltammogram of (a) p-aminobenzoic acid and (b) poly(p-aminobenzoic acid) in 0.1 M KCl/10 mM ammonium hydroxide.

The electrochemical activity of PABA was established by recording a cyclic voltammogram of the polymer. FIG. 4 shows the cyclic voltammograms of the monomer and the polymer recorded at 100 mV/s. The monomer underwent reversible redox reaction, with a redox potential of –0.55 V with respect to an Ag/AgCl electrode. Upon polymerization, the reduction potential shifted to –0.2 V with a large charging current in the reverse cycle. The plot of the peak current verses the square root of the scan rate followed the Randles-Sevcik relationship (peak current proportional to the square root of the scan rate), indicating that the polymer and the monomer were electrochemically reversible redox systems.

In conclusion, a self-doped water-soluble polyaniline was synthesized from p-aminobenzoic acid by a biochemical method. The polymer was polyionic and could be used for the development of self assembled mono and multilayers for the fabrication of thin-film devices and structures (Ferreira, M., et al., "Thin solid films," 244:806 (1994)). The polymer had functional groups available for further molecular engineering, such as incorporation of biological molecules for biosensor applications (Alva, K. S. et al., "Proceedings of SPIE: Smart Materials Technologies and Biomimetics," 2716:152 (1996)).

EXAMPLE 2

Materials

Horseradish peroxidase and Tris-HCl buffer were obtained from Sigma Chemicals Co, St. Louis, Mo. 2,4 Diaminobenzene sulfonic acid (DABSA) was obtained from Aldrich Chemicals Company, Inc., Milwaukee, Wis. All other chemicals and solvents used were of analytical grade or better and used as obtained.

The infrared spectrum was recorded with a Perkin-Elmer 1760X FTIR spectrometer. The UV-Vis spectra were recorded using a Perkin-Elmer LAMBDA-9® UV/VIS/NIR spectrophotometer. The emission characteristics of the polymer were studied using a SLM 8100 spectrofluorometer. The electrochemical characterization of the polymer was carried out using a Potentiostat (EG&G Potentiostat/Galvanostat Model 263). A platinum wire was used as the working electrode. The potential was applied with respect to a silver/silver chloride electrode using platinum mesh as the counter electrode. The reaction was carried out in 0.1M Tris-HCl buffer, pH 6.0, under nitrogen atmosphere. The molecular weight was determined using Gel Permeation Chromatography utilizing Waters Model 510 pump and Waters Model 410 refractive index detector with Jordi columns relative to polystyrene standards. Dimethyl formamide (DMF) containing 1% LiBr was used as the eluent.

Enzymatic Synthesis of the Polymer

The polymerization of DABSA was carried out in 0.1M Tris-HCl buffer, pH 6.0. 0.1 g of DABSA was dissolved in 50 ml of Tris buffer containing 3 units of the enzyme. The reaction was initiated with the addition of 100 μl of 30% hydrogen peroxide with stirring. The polymerization reaction started instantaneously. The reaction was allowed to continue at room temperature for a minimum of 3 hours with constant stirring. The reaction medium was dialyzed against water to remove the buffer. The polymer was then extracted with methanol, which was later evaporated off to obtain dark brown colored polymer with 80% yield.

Thin Films by Layer-By-Layer Technique

Self assembly of the polyaniline poly(DABSA) on a glass slide was carried out by the layer-by-layer deposition technique (Ferreira, M., et al., "Thin solid films," 244:806 (1994)). A glass slide treated with alkali (CHEMSOLV®) was exposed to polycation and polyanion solutions repeatedly to transfer monolayers of these polyelectrolytes per every exposure. 1 mg/ml solution of poly(diallyl dimethyl ammonium chloride) (PDDAC) at pH 2.5 was used as the polycation while 1 mg/ml solution of PDABSA also at pH 2.5 was used as the polyanion. The glass slide was exposed to the polyelectrolyte solution for 10 minutes and washed with water at pH 2.5 to remove the unbound polymer from the surface. This process was repeated to obtain the desired number of bilayers.

RESULTS AND DISCUSSION

KINETIC EXPERIMENTS

Figure 5:
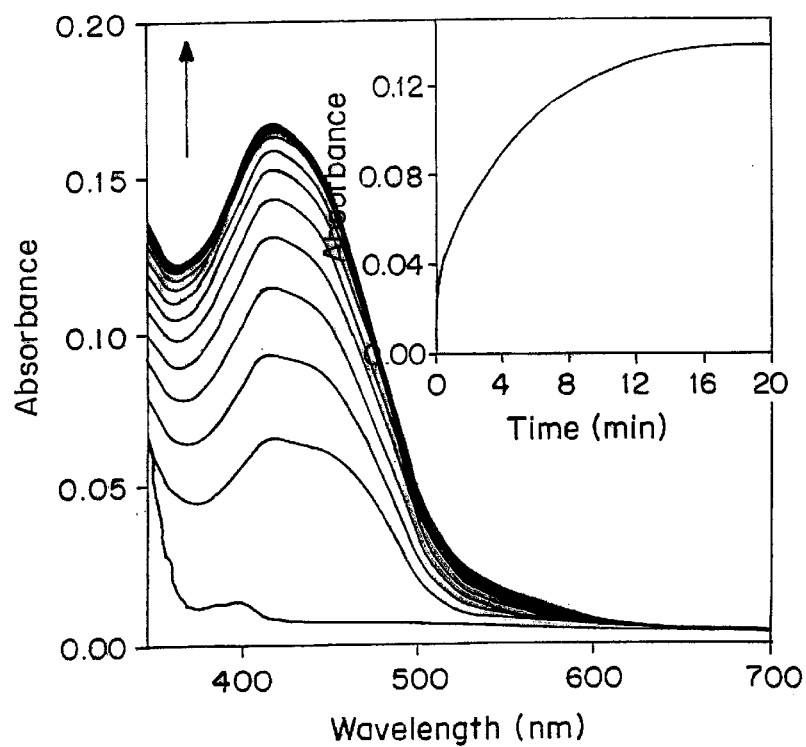
FIG. 5 shows change in the absorption spectrum as a function of time during the polymerization of 2,4 diaminobenzene sulfonate in Tris-HCl buffer, pH 8.0. The inset shows the change in absorbance at 420 nm recorded as a function of time during the polymerization.

The polymerization reaction was followed by UV-Vis spectroscopy. In this experiment, the concentration of hydrogen peroxide, DABSA and the solution pH were chosen such that the reaction rate was low enough to be followed by UV-Vis spectroscopy. FIG. 5 shows a typical set of absorption spectra of DABSA (1 mg/100 ml) recorded during the polymerization in Tris-HCl buffer at pH 8.0, with one minute time intervals after the initiation of the polymerization with 10l of 3% hydrogen peroxide. The inset in FIG. 5 shows the change in absorbance recorded at 420 nm, corresponding to the absorption maximum of the polymer, as a function of time. The changes in absorbance were dramatic in the initial stages of the reaction, which attained a steady state in about 15 minutes. We also observed that the maximum conversion of DABSA is achieved at a pH of 6.0. Therefore, the bulk polymerization was carried out at pH of 6.0. In the bulk polymerization, the reaction was allowed to continue for 3–4 hours with intermittent addition of hydrogen peroxide to ensure completion of the reaction. The reaction medium was then dialyzed against water and extracted with ethanol. GPC analysis showed that the polymer has a molecular weight ($M_w$) of the order of 18000 daltons.

NUCLEAR MAGNETIC RESONANCE STUDIES

Figure 6:
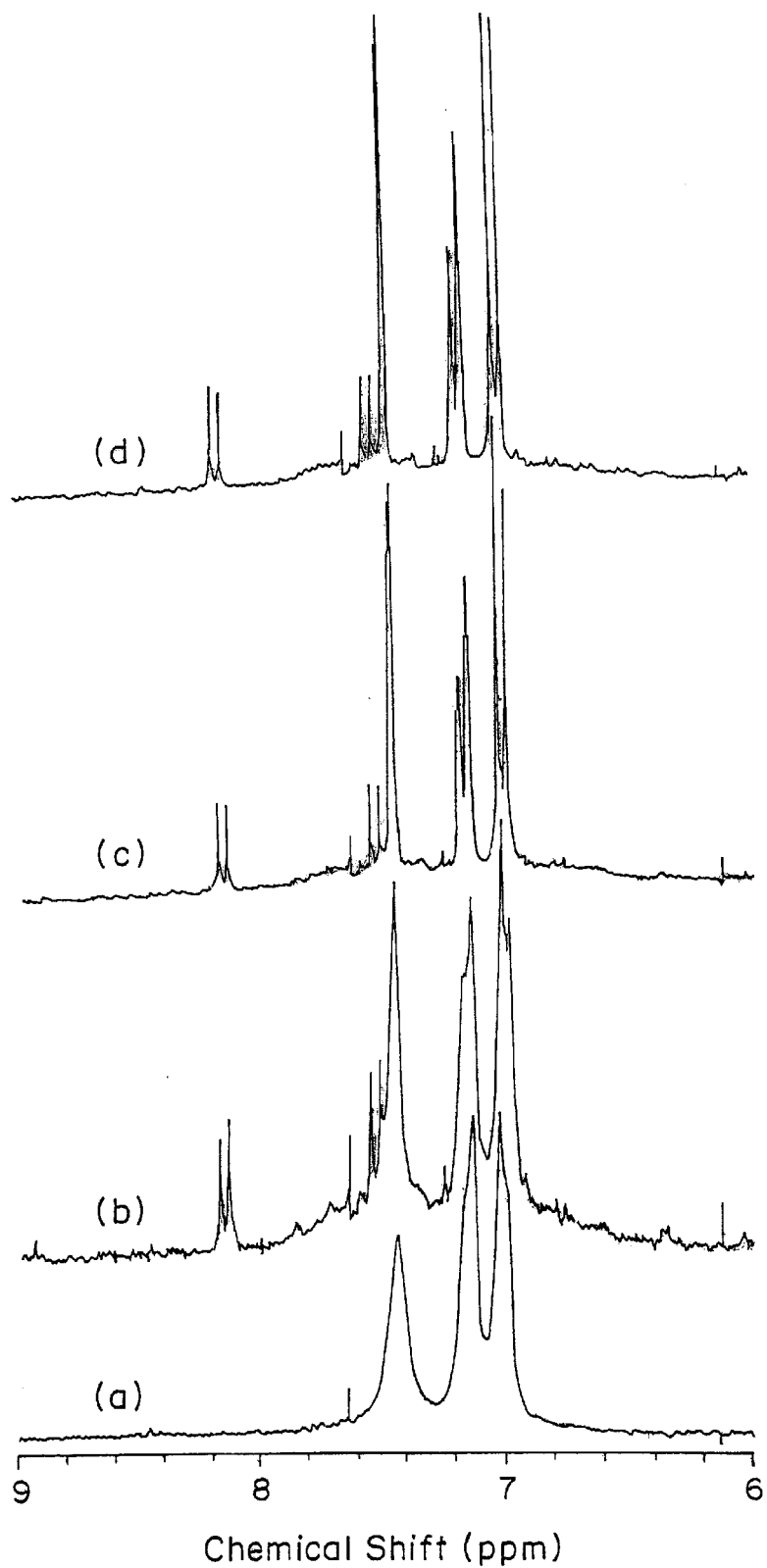
FIG. 6 shows proton magnetic resonance spectra during the polymerization of 2,4 diaminobenzene sulfonic acid in $D_2O$: (a) 2,4 diaminobenzene sulfonic acid with horseradish peroxidase; (b) four minutes after addition of hydrogen peroxide; (c) nine minutes after addition of hydrogen peroxide; and (d) eighteen minutes after addition of hydrogen peroxide.

The polymerization process was also followed by in-situ NMR spectroscopy. The polymerization reaction was carried out in $D_2O$ (sodium phosphate buffer pH 6.0) in a NMR tube. Reaction was initiated by the addition of 2 μl of 30% hydrogen peroxide and the NMR spectra were recorded at different reaction time intervals. Characteristic spectra recorded during the polymerization are given in FIG. 6. FIG. 6(a) is the spectrum of the monomer containing the enzyme, before the addition of hydrogen peroxide. It can be observed from FIG. 6(a) that the monomer showed one singlet and a doublet corresponding to the aromatic protons. The spectral widths are very broad due to the low solubility of the monomer. The molar concentration of the enzyme was very low compared to DABSA, hence its protons did not appear in the NMR spectrum. FIG. 6(b), 6(c) and 6(d) represent the spectra recorded 4 minutes, 9 minutes and 18 minutes after the addition of hydrogen peroxide. As the polymerization reaction progressed, the peak pattern changed, with the appearance of new peaks. These peaks arose from the change in the chemical environment of the aromatic protons upon oxidative free radical coupling. The other striking observation was that the peaks became sharper with the progress of the polymerization reaction. This could be ascribed to the reduced intermolecular hydrogen bonding due to the disappearance of free amine groups upon polymerization, which resulted in improved solubility of the polymer as compared to the monomer. The time scale of the completion of the polymerization reaction is in agreement with the observed 420 nm saturation in the UV-Visible spectroscopic studies.

FT-IR SPECTROSCOPY

Figure 7:
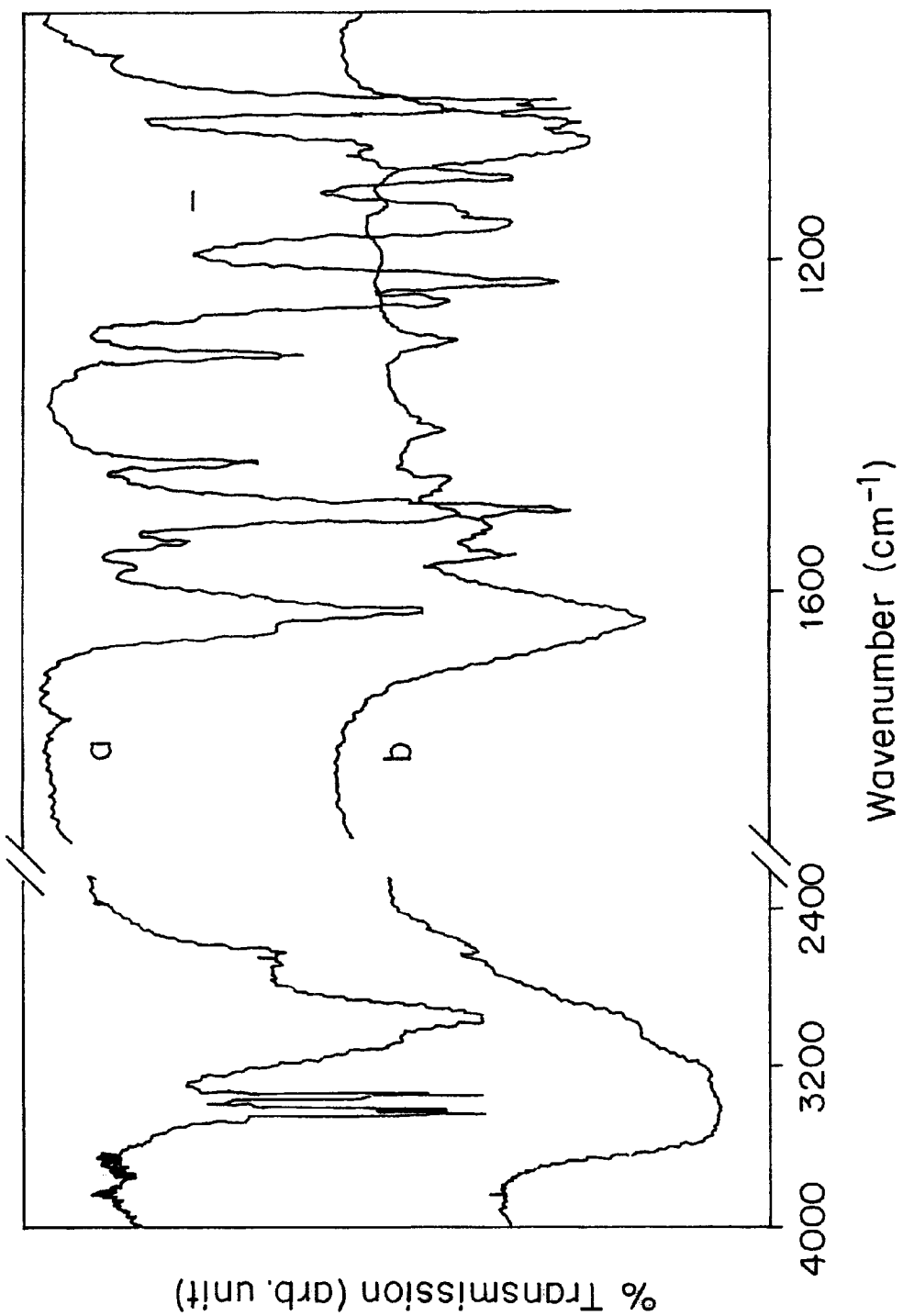
FIG. 7 shows FT-IR spectra of (a) diaminobenzene sulfonate and (b) poly(diaminobenzene sulfonate) in KCl.

The FT-IR spectra DABSA and its polymer in KCl matrix are shown in FIG. 7. The monomer (curve a) shows characteristic amine vibration bands at 3430 $cm^{-1}$ with a shoulder at 3200 $cm^{-1}$. The polymer (curve b) on the other hand shows a broad peak centered around 3450 $cm^{-1}$ with a shoulder around 2940 $cm^{-1}$. The peaks at lower energy regions also become broader upon polymerization. The number of vibrational bands in the ring hydrogen rocking regime (1250–1000 $cm^{-1}$) is lower in the case of polymer as compared to the monomer, indicating the disappearance of the ring hydrogens upon polymerization.

ABSORPTION CHARACTERISTICS

Figure 8:
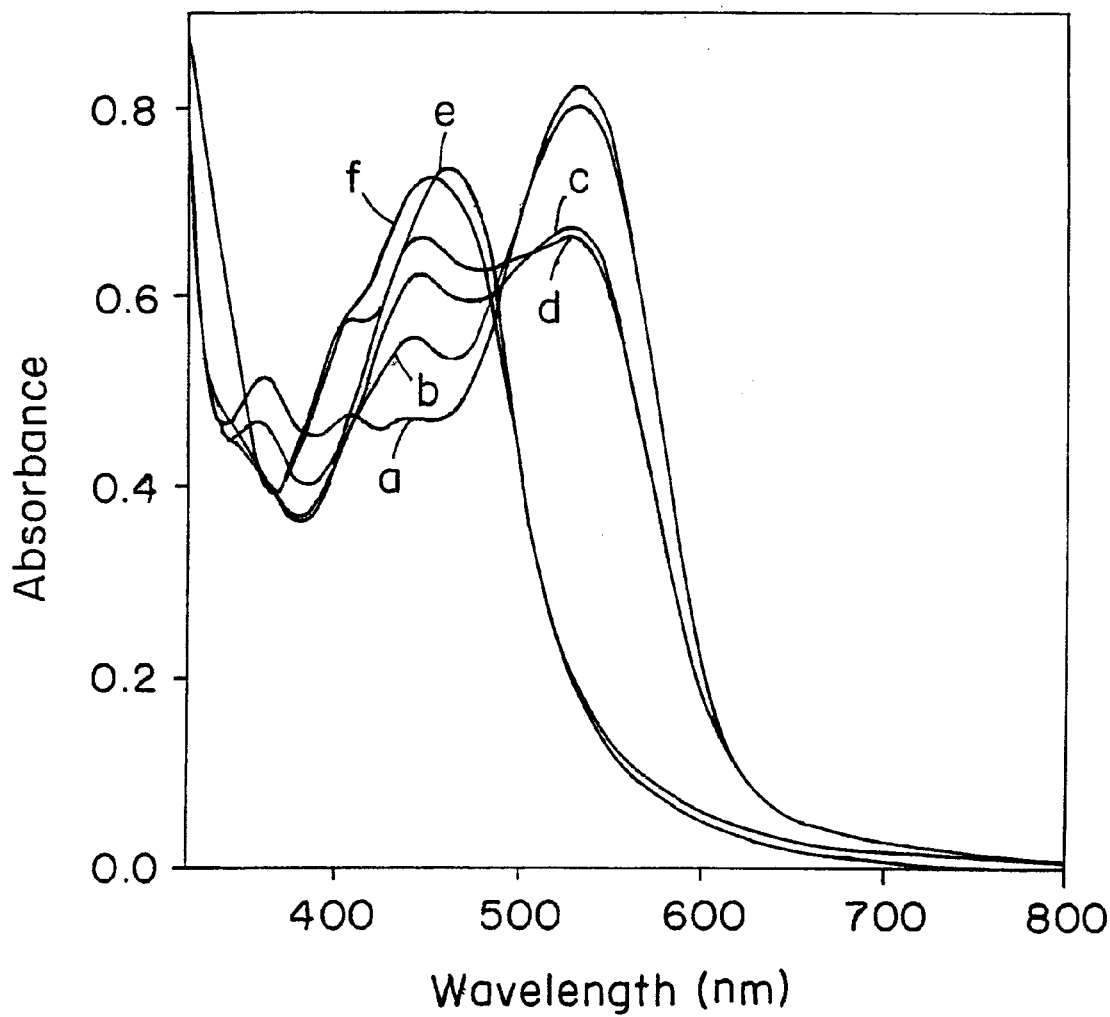
FIG. 8 shows absorption spectra of poly(2,4 diaminobenzene sulfonic acid) in solutions of different pH values. (a) 1.2; (b) 3.0; (c) 6.0; (d) 9.0; (e) 10.0; and (f) 12.8.
Figure 9:
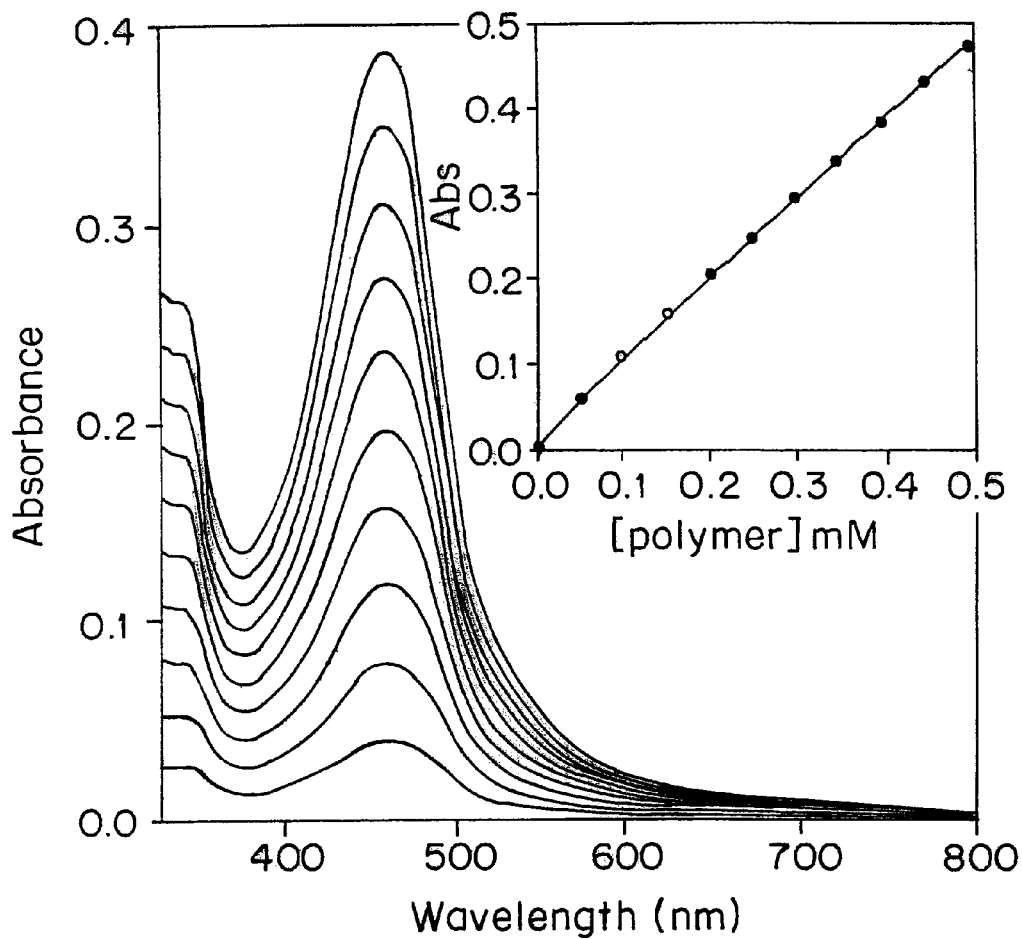
FIG. 9 shows plot of change in absorbance as a function of concentration recorded at pH 10.0 for the polymer. The inset gives the optical density at 470 nm as a function of concentration measured at a pH of 6.0.

FIG. 8 shows the effect of pH on the absorption spectrum. The stock solution of the polymer at pH 7.0 was diluted to a constant dilution in 0.1M KCl solution at various final pH values. It can be observed from the figure that the absorption characteristics underwent a series of changes upon increasing the solution pH from 1.3 to 12.8. The absorption at 540 nm decreased with increasing pH while a new peak appeared around 445 nm upon increasing the solution pH. The absorption band at 540 nm was assigned to the doped form of the polymer while at 445 nm the conjugated polymer exhibited its characteristic absorption band. The conversion from the doped to the undoped form of the polymer was instantaneous, as observed by spectral changes, indicating that the undoping kinetics was rapid. The polymer could be shuttled between its doped and undoped forms by the proper choice of solution pH. FIG. 9 shows the absorption spectra of the polymer recorded as a function of concentration at pH 1.2. The absorbance increases linearly with concentration. The inset presents the absorbance at the peak maximum (540 nm) measured at a pH 6.0 plotted as a function of the concentration of the polymer. The absorbance follows a linear relationship with concentration.

EMISSION CHARACTERISTICS

Figure 10:
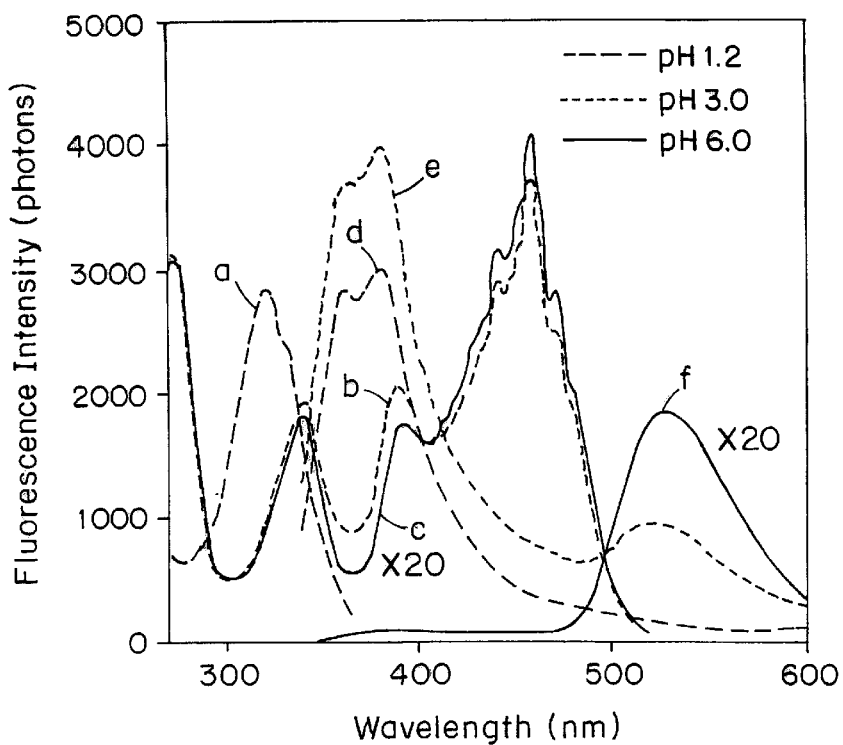
FIG. 10 shows excitation and emission spectra of poly (diaminobenzene sulfonate) at: pH 1.2 (plots a and d); pH 3.0 (plots b and e); and pH 6.0 (plots c and f). The intensities in plots c and f have been divided by two in this representation. The spectra above pH 6.0 are identical to those at pH 6.0.

FIG. 10 shows the excitation and emission spectra of the polymer at various pH conditions. The emission characteristics show an interesting pH dependence. The polymer at pH 1.2 had emission (curve d) only in the blue region. The emission maximum was 380 nm with an excitation maximum at 320 nm (curve a). Upon increasing the pH to 3.0, a new emission band at 530 nm (curve e) appeared with an intensity comparable to that at 380 nm. The excitation spectrum (curve b) shows multiple bands with peak maxima at 340, 380 and 460 nm unlike at pH 1.2. Upon increasing the pH to 6.0, the emission at 530 nm (curve f) increased and the intensity was about two orders of magnitude higher than that of low pH solution. The excitation spectrum was identical to that at pH 3.0 except for the intensity. These observations indicate that the polymer existed predominantly in the acid form at pH 1.2. At pH 3.0, the doped and undoped forms of the polymer coexisted. At pH 6.0, the undoped form of the polymer dominated in the solution. Similar spectral features were observed at pH values above 6.0. This dependence of the characteristic emission features on solution pH could be attributed to the pKa values of the amine groups (~3.0).

ELECTROCHEMICAL PROPERTIES

Figure 11:
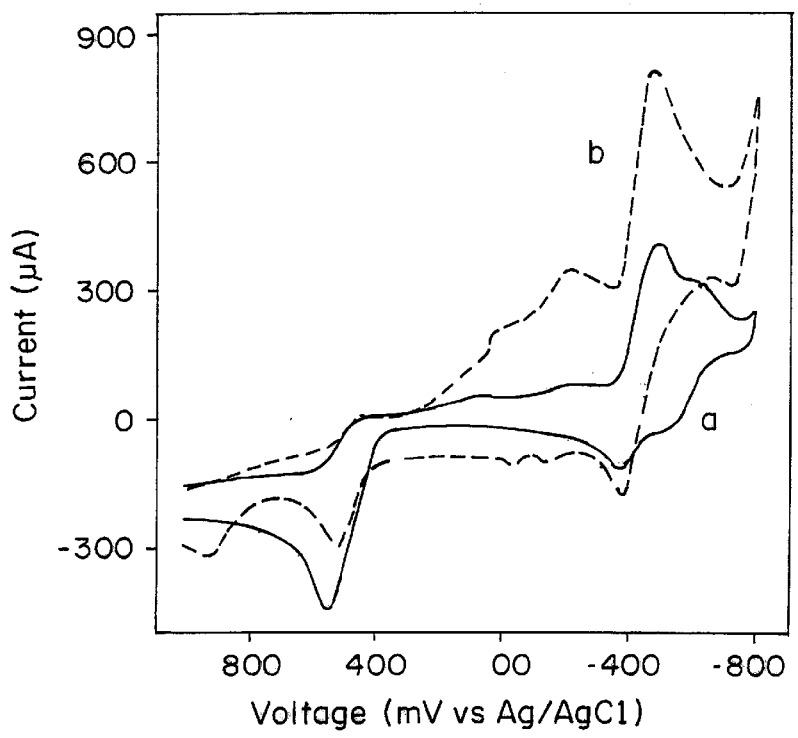
FIG. 11 shows cyclic voltammograms of (a) 2,4 diaminobenzene sulfonic acid and (b) poly(2,4 diaminobenzene sulfonic acid) under nitrogen atmosphere. The potential at the platinum wire working electrode was varied at a scan rate of 50 mV/s with respect to Ag/AgCl reference electrode. A platinum mesh electrode was used as counter electrode.

FIG. 11 examines the cyclic voltammograms of the monomer and the polymer at a platinum electrode at pH of 6.0. Curve (a) is the cyclic voltammogram of the monomer in the presence of horseradish peroxidase. The peak current followed a linear relation with the square root of the scan rate indicating that the monomer was a component of an electrochemical redox system. The monomer was allowed to polymerize in the reaction cell by the addition of 10 µl of 30% hydrogen peroxide and the reaction was allowed to continue for 30 minutes. Curve (b) is the cyclic voltammogram of the reaction mixture after 30 minutes of enzymatic polymerization. Upon polymerization, the peak currents at monomer redox potentials have decreased, with the appearance of a new reduction potential at −0.225V corresponding to the polyaniline. The oxidation potential (+0.52V with respect to Ag/AgCl) of the polymer was identical to that of the monomer. However, the oxidizable species were lower in concentration in the case of polymer resulting in a lower peak current. The peak current followed a linear relationship with the square root of the scan rate, as in the case of the monomer, indicating that the polymerization was also a reversible redox system.

The polymer, as synthesized, showed a conductivity in the semiconducting regime ($10^{-5}$ S/cm). The low conductivity could be attributed to the complex structure of the polymer. The conductivity of the polymer could be improved by co-polymerizing with underivatized aniline with a stoichiometry such that solubility was still maintained.

THIN FILMS BY LAYER-BY-LAYER TECHNIQUE

HISTORY OF LAYER-BY-LAYER TECHNIQUE

Figure 12:
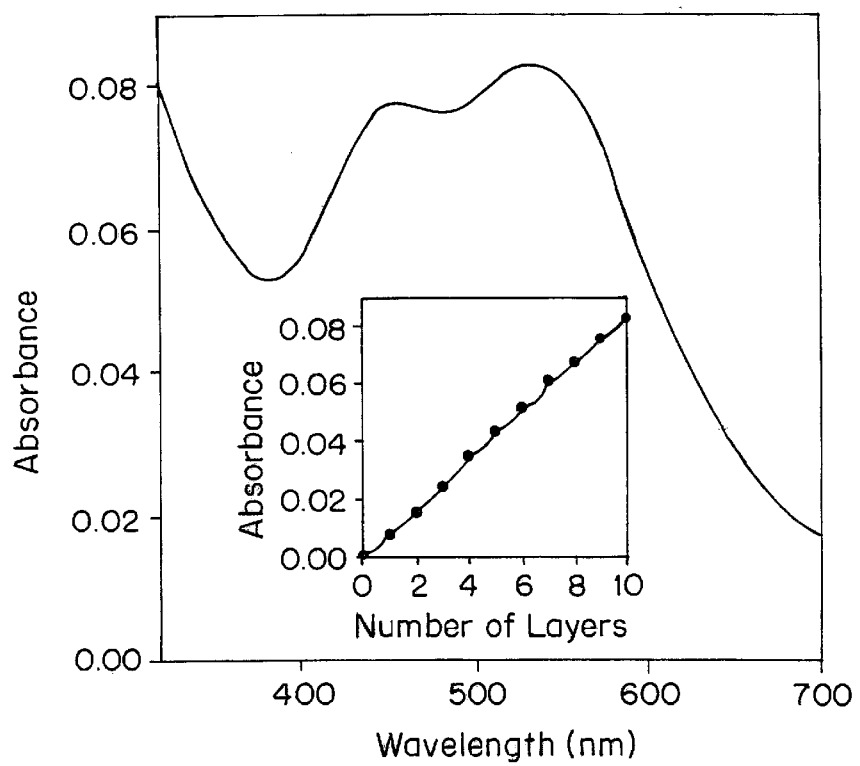
FIG. 12 shows absorption spectrum of 10 bilayers of poly 2,5 diaminobenzene sulfonate (PDABSA) and poly(diallyl dimethyl ammonium chloride) (PDDAC) deposited by a layer-by-layer technique of the invention. The inset shows the absorption maximum at 535 nm as a function of bilayers.

The solubility of the polyaniline described in this study at all pH conditions made it a perfect candidate for the fabrication of thin films by the layer-by-layer technique. This polymer can be used as polyanion with another polycation of interest. The preliminary studies on fabrication of multilayers by this technique indicated that multilayers of this polyaniline can be prepared at any pH condition with a proper choice of the polycation. FIG. 12 shows the absorption spectrum of ten bilayers of polyaniline with PDDAC deposited on a glass slide at pH 2.5. Since PDDAC was not absorbing in the spectral region scanned in this study, the absorbance was solely due to the polyaniline. The absorption spectrum of the multilayer assembly shows the absorption maxima at 535 nm and 450 nm, respectively. The inset in FIG. 12 shows the absorbance recorded at 535 nm as each bilayer was deposited on the glass slide. The constant change in absorbance per bilayer indicates that thin films can be built with precise control over thickness and organization. Similar observation was also made at neutral pH conditions.

EXAMPLE 3

MATERIALS AND METHODS

Horseradish peroxidase was obtained from Sigma Chemicals Co., St. Louis, Mo. All aniline and phenol derivatives were purchased from Aldrich Chemicals Co. Milwaukee, Wis. in the purest form possible. All the chemicals were used as obtained.

Enzyme-catalyzed polymerization of phenols and anilines were carried out in aqueous media unless otherwise mentioned. The monomer solution containing the enzyme in a Tris-HCl buffer solution at a pH of 6.5 was treated with hydrogen peroxide under ambient conditions. The reaction was allowed to continue for about three hours. The water-soluble polymers were dialyzed against water and the resulting polymer was extracted to DMF. In the case of water-insoluble polymers, the polymers were filtered off and washed with water to remove the unreacted monomer and the biocatalyst.

All spectroscopic characterization of the polymer and polymerization reaction were done using a Perkin-Elmer LAMBDA-9® UV-Vis-near IR spectrophotometer. The vibration spectra of the polymers were recorded using Perkin-Elmer FT-IR spectrophotometer. The proton and C-13 NMR spectra were recorded on a Bruker 200 MHz NMR spectrometer. The electrochemical properties of the polymers were studied using a Potentiostat (EG&G potentiostat/Galvanostat model 263) in a three electrode setup containing platinum wire, Ag/AgCl and platinum mesh as the working, reference and counter electrode in nitrogen saturated Tris-HCl buffer at pH 6.5.

RESULTS AND DISCUSSION

POLY(P-AMINO BENZOIC ACID)

Poly(p-amino benzoic acid) was obtained by HRP catalyzed polymerization of p-amino benzoic acid in Tris-HCl buffer at pH 6.0 (Alva, K. S., et al., "Macromolecular Rapid Communications" 17:000 (1996)). The polymer was precipitated as dark brown solid by lowering the solution pH. The precipitate was filtered off and washed with acidified water to remove unreacted monomer and the enzyme. The polymer was soluble in water under neutral and alkaline conditions. The polymer had a molecular weight on the order of 3K daltons. The polymer was characterized by FT-IR spectroscopy. The peak positions at 3450cm-1 and the disappearance of the ring rocking frequencies were indicative of the polymerization. The optical properties of the polymer are influenced by the solution pH conditions. A plot of absorption and emission properties indicated that absorbance at longer wavelength disappeared upon increasing the solution pH. It has been observed that the spectral features remained unchanged until a pH value of 10 was reached, and thereafter the absorbance at 520 nm decreased. It has also been observed that the decrease in the absorbance at 520 nm was indicative of a slow reaction. These changes in absorbance upon increasing the solution pH were ascribed to undoping of the polymer. A cyclic voltammogram of the polymer in 0.1M KCl solution the presence of 10 mM ammonium hydroxide indicated that a peak current followed a linear relationship with the square root of the scan rate, indicating that the polymerization was a reversible redox system. The polymer displayed a large charging current at positive potential during the oxidation cycle. The polymer as synthesized showed a conductivity on the order of $10^{-5}$S/cm.

POLY(2,5 DIAMINOBENZENE SULFONATE)

The chemical synthetic routes of sulfonated polyanilines involved post-treatment of the polymer with fuming sulfuric acid. In the biochemical synthesis a sulfonated aniline derivative, 2,5 diaminobenzene sulfonate, was polymerized to obtain a water-soluble polyaniline. The molecular weight of the polymer was on the order of 18K daltons. The polymerization was also confirmed by FT-IR spectroscopy. This polymer was soluble at all solution pH conditions. A plot of absorption spectra of the polymer at different pH conditions indicated that absorbance at 540 nm decreased with an increase in solution pH conditions and, at 470 nm, increased with pH. At pH 1.2, the polymer emitted at 380 mn when excitation was at 320 nm, while at pH 6.0 the emission maximum shifted to 540 nm. A cyclic voltammogram of the polymer in 0.1M Tris-HCl buffer at pH 6.0. The peak current followed a linear relationship with the square root of the scan rate, indicating that the polymerization was a reversible redox coupling.

POLY(PHENYLAZOANILINE)

Figure 13:
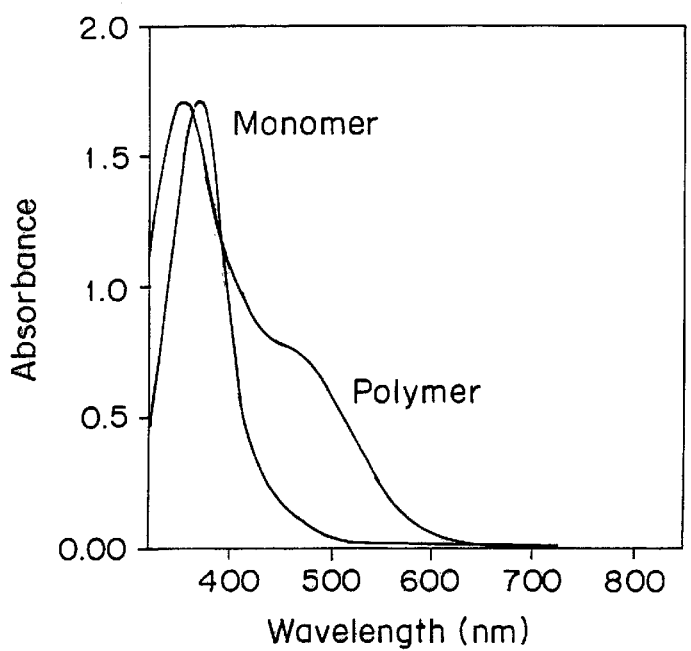
FIG. 13 shows absorption spectra of phenylazoaniline and poly(phenylazoaniline) in dimethyl formamide (DMF).

Polymerization of phenylazoaniline has been catalyzed by horseradish peroxidase in the presence of hydrogen peroxide. The polymer precipitated out of the solution within about half an hour of reaction initiation, the polymer precipitate was later filtered off and washed with 50% ethanol to remove unreacted monomers, and then with water to remove the enzyme. The polymer was soluble in polar organic solvents like DMF and DMSO with a molecular weight of about 3000 daltons. The absorption spectra of the polymer and the monomer of phenylazoaniline in DMF are given in FIG. 13.

Figure 14:
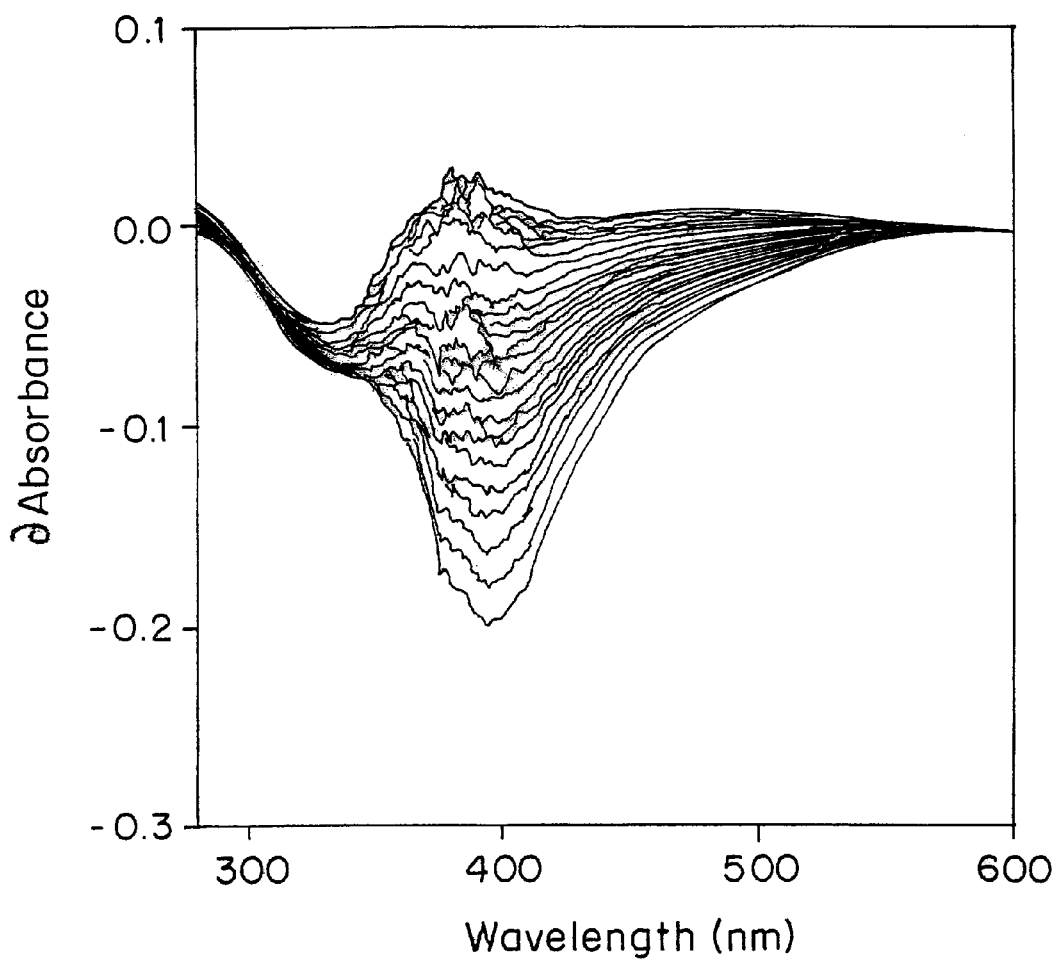
FIG. 14 shows relaxation of absorption spectra of poly (phenylazoaniline) in DMF after exciting with an argon ion laser for ten minutes.

The azo groups underwent cis-trans isomerization upon exposure to light. In this study, we exposed the DMF solution of poly(phenylazoaniline) to a diffused argon ion laser light for ten minutes. The polymer was then allowed to relax in ambient conditions and the absorption spectra were recorded as a function of time. The difference of the spectra with that before exposure to laser light is plotted in FIG. 14. It can be observed from the figure that the polymer underwent conformation changes upon exposure to the laser light, which relaxed back to a conformation different than that before excitation. The direction of the arrow in the figure indicates the decrease in the absorbance. Similar observation were also made when the polymer was excited with UV light at 360 nm. This indicated that the polymer had a constrained structure in solution. The low molecular weight of the polymer suggested that the backbone, as well as the side chain of the polymer, underwent cis-trans isomerization resulting in a different conformation upon relaxation.

POLY(DIAMINOAZOBENZENE)

Figure 15:
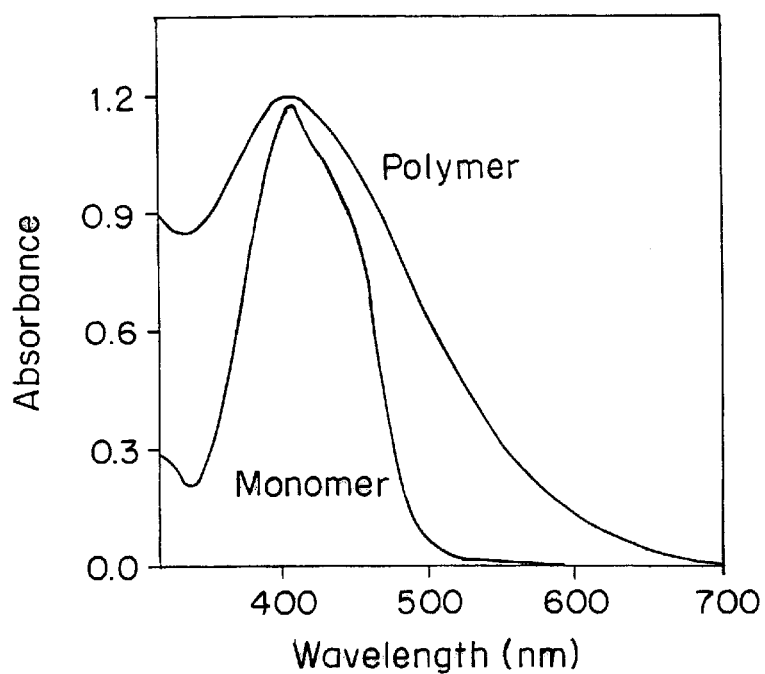
FIG. 15 shows absorption spectra of (a) diaminoazobenzene and (b) poly(diaminoazobenzene) in DMF.

Poly(diaminoazobenzene) was synthesized from diaminoazobenzene by oxidative free radical coupling in 20% ethanol solution. The brown precipitate, which was soluble in polar organic solvents, had a molecular weight of 80K daltons. The absorption spectrum of the polymer and the monomer in DMF is presented in FIG. 15.

Figure 16:
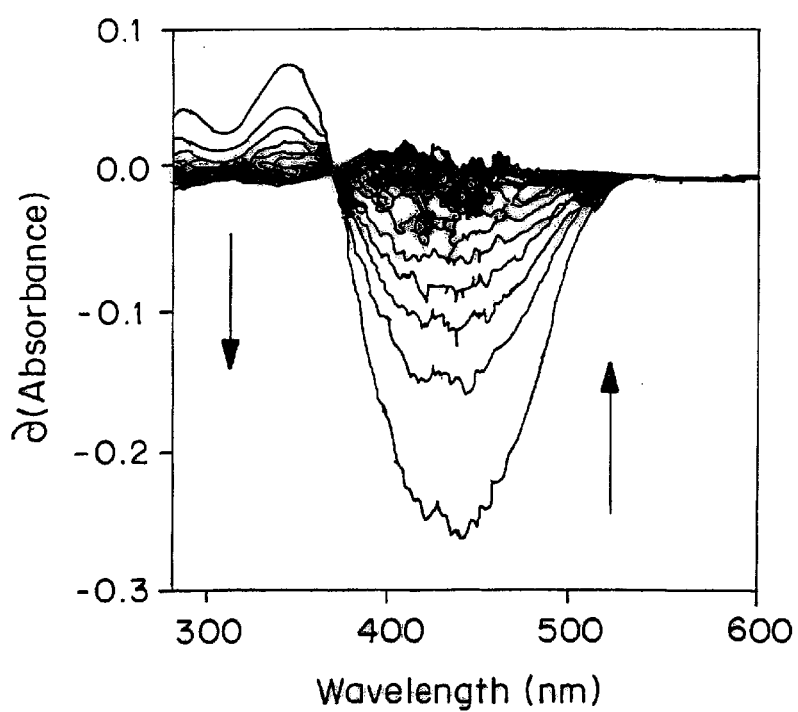
FIG. 16 shows relaxation of absorption spectra of poly (diaminoazobenzene) in DMF after exciting with an argon ion laser for ten minutes.

The cis-trans isomerization of the polymer upon excitation to an argon ion laser was studied in a situation identical to that of the poly(phenylene diamine). The different spectra during the course of relaxation after photoexcitation are provided in FIG. 16. It can be observed from the figure that the polymer relaxed back to its original conformation after photoexcitation. The direction of the arrow in the figure indicates the decrease in the absorbance. Similar observations were also made upon excitation to UV light at 360 nm. This can be attributed to the higher molecular weight of the polymer, which allowed only the side chains to undergo cis-trans isomerization upon photoexcitation. The backbone isomerization was energetically not favored under these experimental conditions. It was observed that, upon heating the solution, where one would expect the backbone to undergo structural randomization, the polymer underwent irreversible conformation changes.

Figure 17:
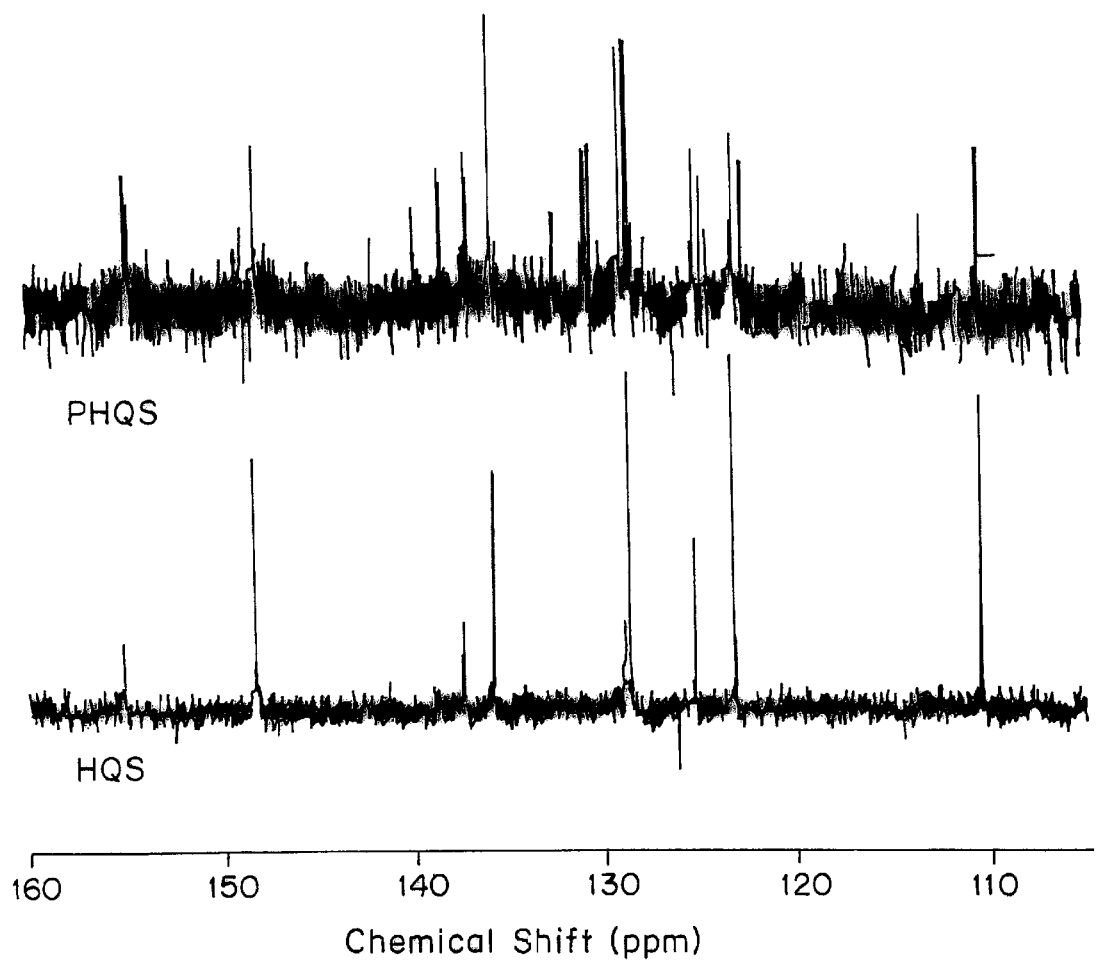
FIG. 17 shows C-13 spectra of 8-hydroxy quinoline-5-sulfonate (HQS) and poly(8-hydroxy quinoline-5-sulfonate) (PHQS) in $D_2O$ recorded using a Bruker® 200 MHz NMR spectrometer.

POLYPHENOLS AS METAL ION SENSORS 8-hydroxy quinoline is a bidentate ligand, which forms complexes with metal ions such as Fe(III). 8-hydroxy quinoline-5-sulfonate (HQS) was enzymatically polymerized to give a water-soluble polymer (PHQS). PHQS is a polymeric ligand. FIG. 17 shows the carbon-13 spectra of the monomer and the polymer. It was established by in-situ NMR studies that the oxidative free radical coupling took place at positions 2, 4 and 7 with the order of preference being 7>2>4.

Figure 18:
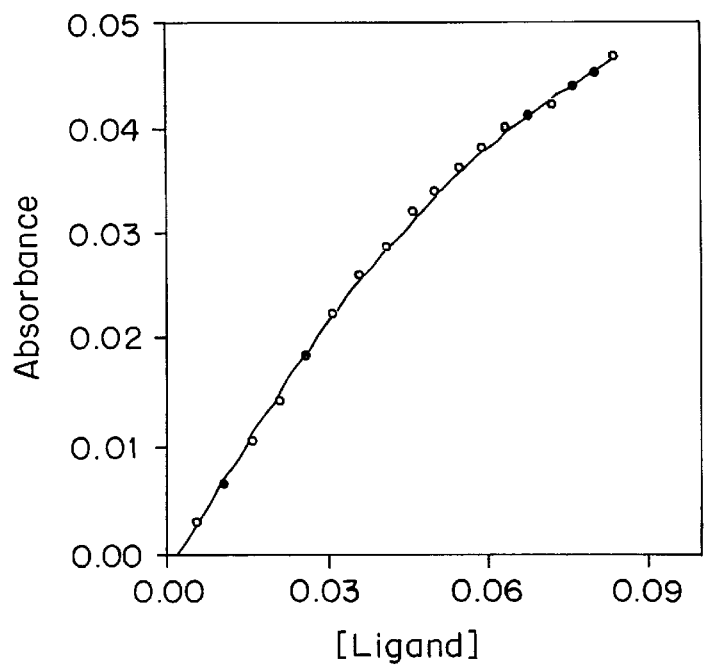
FIG. 18 shows a plot of absorbance as a function of concentration of the ligand for a fixed concentration of $FeCl_3$, measured at 440 nm.
Figure 19:
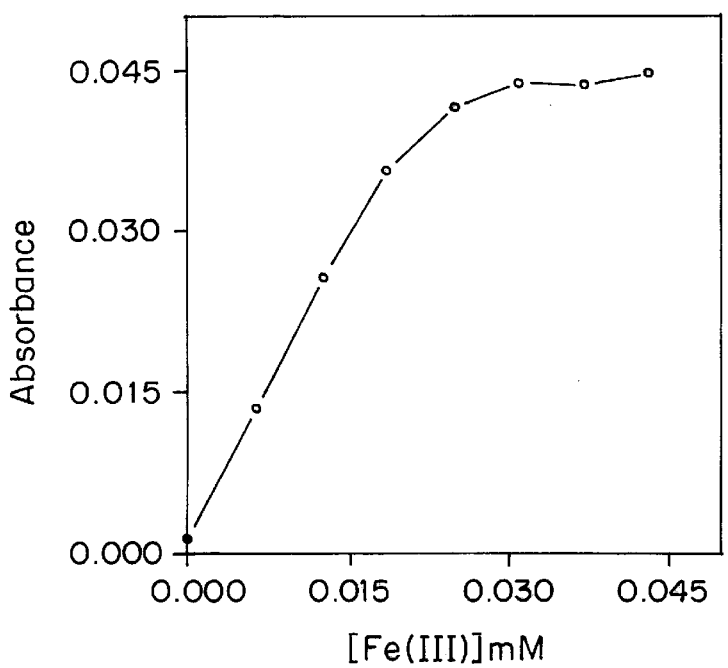
FIG. 19 shows a change in absorbance as a function of $FeCl_3$ concentration for a fixed concentration of the polymeric ligand.

FIGS. 18 and 19 show the plots of absorbance as a function of concentration of the metal ion and the ligand for a fixed concentration of the ligand and the metal ion, respectively. The lower detection ranges for the metal ion can be achieved by the proper control of the concentration of the ligand. The ligand has different complexation capacities with various metal ions. One can use this polymeric ligand in the immobilized form for a sensitive metal ion sensor fabrication. With the development of layer-by-layer multilayer deposition based on the charge neutrality of polyelectrolytes, these polymeric ligands can be assembled into organized multilayers that can be used as solid state sensors for the metal ions.

EQUIVALENTS

Those skilled in the art will recognize, or be able to ascertain using no more than routine experimentation, many equivalents of the invention described specifically herein. Such equivalents are intended to be encompassed in the scope of the following claims.

We claim:

1. A method of forming a water-soluble polymer, comprising the step of combining a redox monomer having at least one charged substituent with a water-based solvent and an enzyme, to form a reaction mixture that causes the redox monomer to polymerize, thereby forming the water-soluble polymer.

2. The method of claim 1, wherein the reaction mixture further includes a second redox monomer, wherein said second redox monomer is water-insoluble whereby the water-soluble polymer formed is a copolymer.

3. The method of claim 1, wherein the redox monomer is a substituted aniline.

4. The method of claim 3, wherein the redox monomer is 2,5'diaminobenzene sulfonate.

5. The method of claim 3, wherein the redox monomer is 4,4'diamino stilbene-2,2'disulfonic acid.

6. The method of claim 3, wherein the redox monomer is o-aminobenzene sulfonic acid.

7. The method of claim 3, wherein the redox monomer is p-aminobenzene sulfonic acid.

8. The method of claim 3, wherein the redox monomer is p-aminobenzoic acid.

9. The method of claim 3, wherein the redox monomer is sulfanilic acid.

10. The method of claim 1, wherein the redox monomer is a substituted phenol.

11. The method of claim 10, wherein the redox monomer is tyrosine.

12. The method of claim 10, wherein the redox monomer is p-hydrobenzoic acid.

13. The method of claim 10, wherein the redox monomer is phenol red.

14. The method of claim 10, wherein the redox monomer is dopamine.

15. The method of claim 10, wherein the redox monomer is acid red.

16. The method of claim 1, wherein the substituent is a cation.

17. The method of claim 1, wherein the substituent is an anion.

18. The method of claim 3, wherein the substituent is at an ortho position.

19. The method of claim 3, wherein the substituent is at the para position.

20. The method of claim 1, wherein the enzyme is a peroxidase.

21. The method of claim 20, wherein the peroxidase is horseradish peroxidase.

22. The method of claim 20 further including the step of combining hydrogen peroxide with the reaction solution.

23. The method of claim 1, wherein the redox monomer is a dye.

24. The method of claim 23 wherein the redox monomer is an azo compound.

25. The method of claim 1, wherein the redox monomer is a ligand.

26. The method of claim 1, wherein the reaction mixture has a pH in a range of greater than about 4.

27. The method of claim 26, wherein the reaction mixture has a pH of between about 6 and about 8.

28. The method of claim 1, wherein the substituent is a sulfonate group.

29. The method of claim 1, wherein the substituent is a carboxyl group.

30. The method of claim 1, wherein a first substituent is a cation and a second substituent is an anion.

31. The method of claim 25, wherein the redox monomer is a substituted hydroxyquinoline.

32. The method of claim 1, wherein the water-soluble polymer is electrically conductive.

33. The method of claim 31, wherein the water-soluble polymer has an electrical conductivity of about $10^{-8}$ S/cm to $10^{-1}$ S/cm.

34. The method of claim 1, wherein the water-soluble polymer is optically active.

35. The method of claim 10, wherein the substituent is at an ortho position.

36. The method of claim 10, wherein the substituent is at the para position.

37. The method of claim 1, wherein the reaction mixture further includes an unsubstituted redox monomer, whereby the water-soluble polymer formed is a copolymer.

* * * * *

UNITED STATES PATENT AND TRADEMARK OFFICE
CERTIFICATE OF CORRECTION

PATENT NO. : 5,994,498　　　　　　　　　　　　　　Page 1 of 2
DATED : November 30, 1999
INVENTOR(S) : Sukant Tripathy, Lynne A. Samuelson, K. Shridhara Alva, Jayant Kumar and Kenneth A. Marx It is certified that error appears in the above-identified patent and that said Letters Patent is hereby corrected as shown below:

On the title page: Item [73] Assignee:

should read as follows: University of Massachusetts Lowell, Lowell, Massachusetts and Government of the United States, as represented by the Secretary of the Army, Washington, D.C.

UNITED STATES PATENT AND TRADEMARK OFFICE
CERTIFICATE OF CORRECTION

PATENT NO. : 5,994,498
DATED : November 30, 1999
INVENTOR(S) : Sukant Tripathy, Lynne A. Samuelson, K. Shridhara Alva, Jayant Kumar and Kenneth A. Marx It is certified that error appears in the above-identified patent and that said Letters Patent is hereby corrected as shown below:

At Claim 33, line 1, delete "Claim 31" and insert --Claim 32--.

Signed and Sealed this

Fifth Day of September, 2000

Attest:

Q. TODD DICKINSON

Attesting Officer

Director of Patents and Trademarks